United States Patent [19]

Ohtani

[11] Patent Number: 4,756,603
[45] Date of Patent: Jul. 12, 1988

[54] GLARE-PROOF TRANSPARENT COVER PLATE

[75] Inventor: Youichi Ohtani, Nagaoka, Japan

[73] Assignee: Nippon Seiki Co., Ltd., Nagaoka, Japan

[21] Appl. No.: 899,168

[22] Filed: Aug. 22, 1986

[30] Foreign Application Priority Data

Jan. 31, 1986 [JP] Japan .................................. 61-20474
Feb. 28, 1986 [JP] Japan .................................. 61-44688

[51] Int. Cl.$^4$ ............................................. G02B 27/00
[52] U.S. Cl. ................................ 350/276 R; 350/127; 350/129
[58] Field of Search ................. 350/276, 276 SL, 277, 350/283, 284, 127–129, 321

[56] References Cited

U.S. PATENT DOCUMENTS 3,213,751 10/1965 Benjamin et al. .................... 350/127
4,071,292 1/1978 Ise et al. ............................... 350/128
4,165,920 8/1979 Brown ............................. 350/276 R
4,560,251 12/1985 Mürjahn ......................... 350/276 R

FOREIGN PATENT DOCUMENTS 56-133701 3/1980 Japan .

Primary Examiner—Bruce Y. Arnold
Assistant Examiner—Loha Ben
Attorney, Agent, or Firm—Lowe, Price, LeBlanc, Becker & Shur

[57] ABSTRACT

A glare-proof transparent cover plate has a flat planar back and a front, facing the user, formed in a parallel arrangement of minute sawtooth ridges each having a horizontal facet extending substantially perpendicularly to the flat back and an inclined facet inclined to the flat back at an angle $\alpha \geqq (\beta + \omega)/2$, where $\alpha$ is the inclination of the inclined facet to the flat plane, $\beta$ is the angle of refraction of the incident rays of light within the cover plate and $\omega$ is the critical ange of the cover plate material. Enhanced glare-proofing results from the provision of narrow shading masks at the sawtooth ridges, by making the horizontal facet surface irregular and/or by providing pigment and/or particles in the cover plate material.

14 Claims, 4 Drawing Sheets

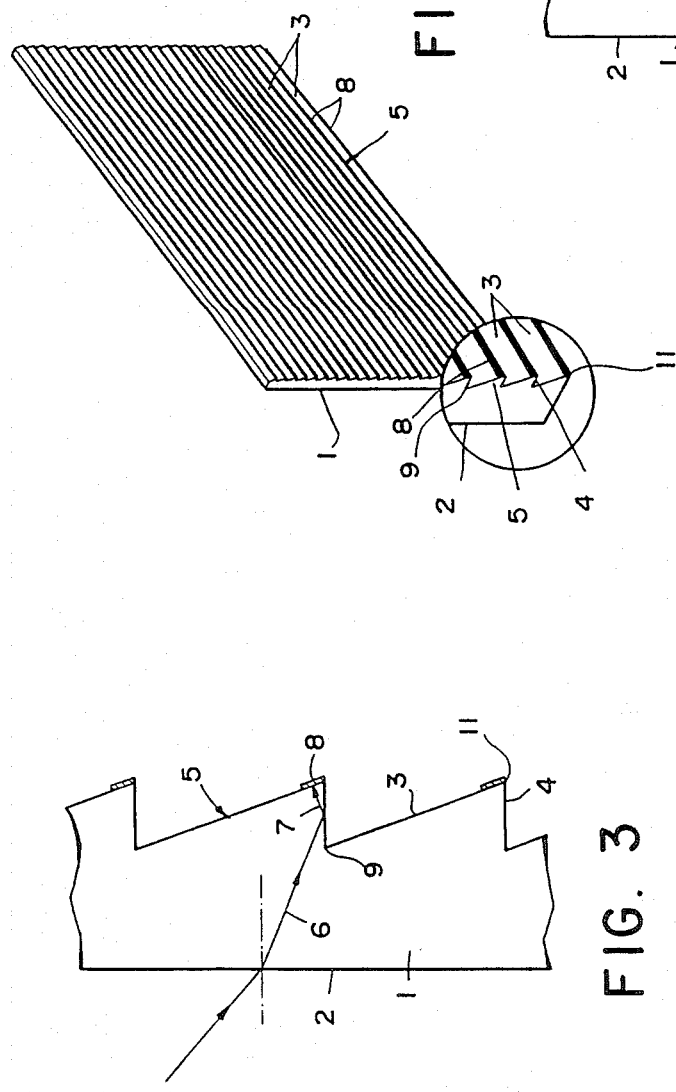
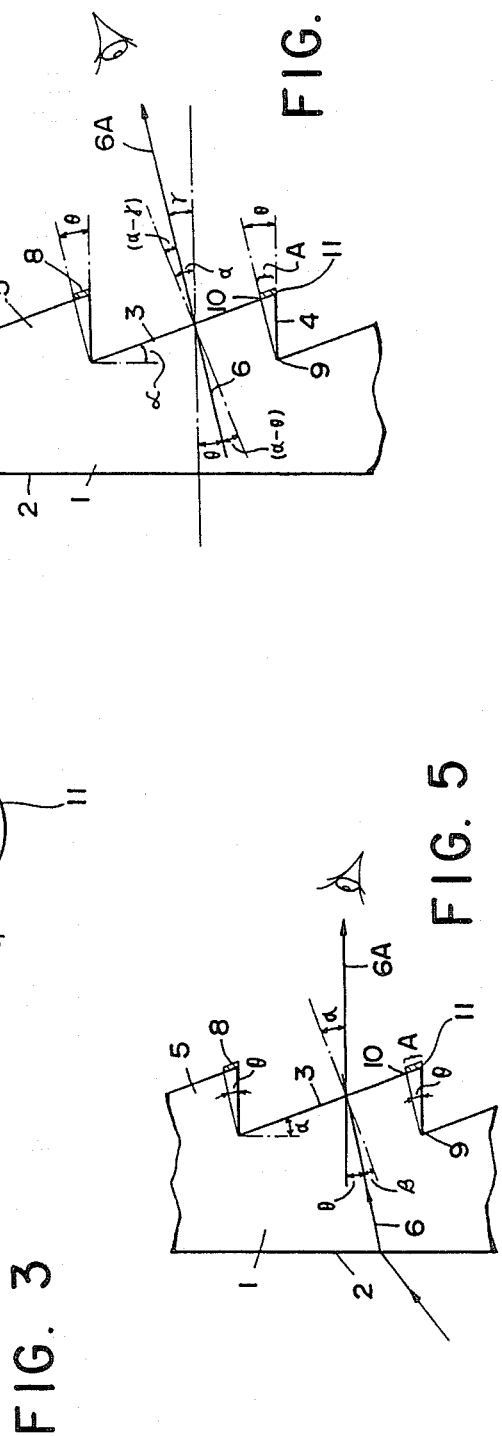
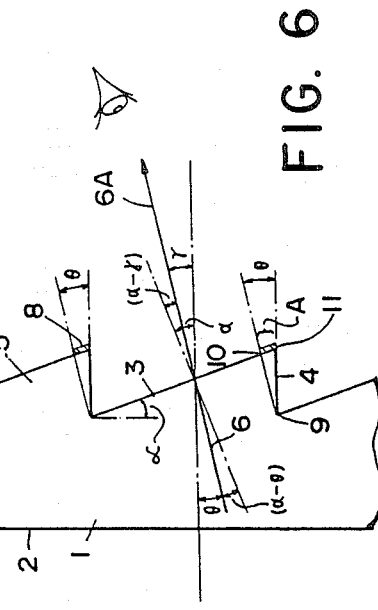

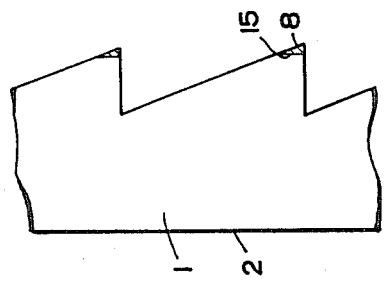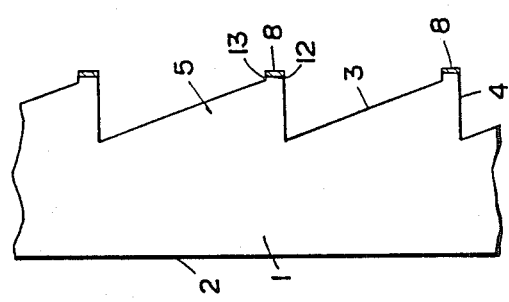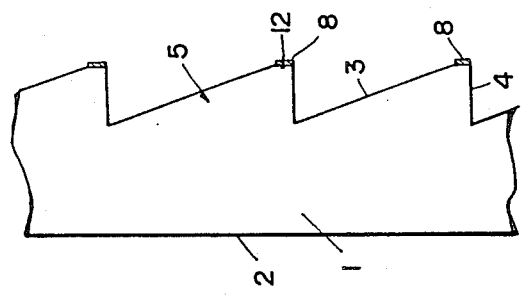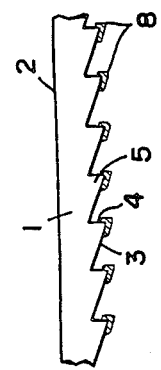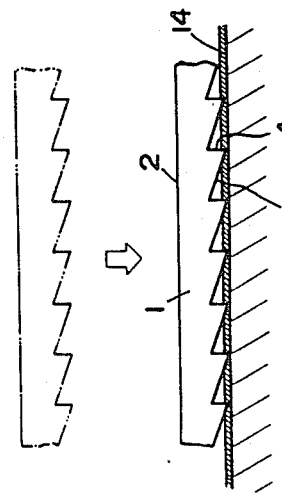

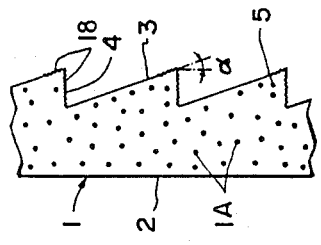
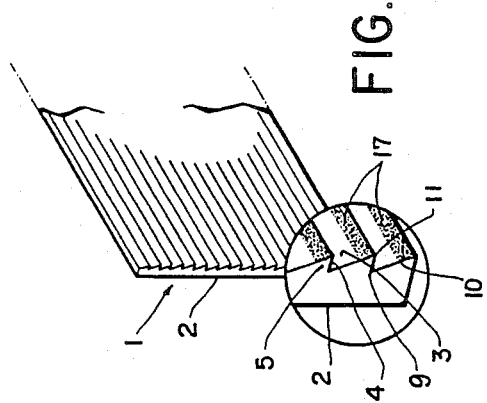
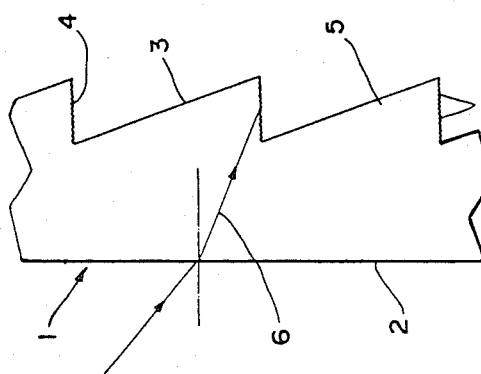
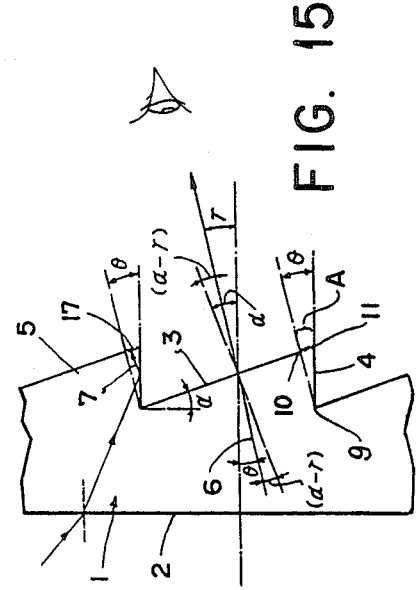
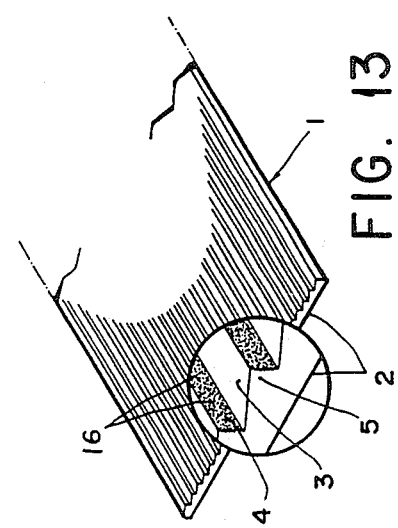

GLARE-PROOF TRANSPARENT COVER PLATE

BACKGROUND OF THE INVENTION

1. Field of the Invention

The present invention relates to a transparent cover plate for preventing the surface reflection of the display screen of a display apparatus and, more particularly, to a glare-proof transparent cover plate capable of reflecting external incident light in a course deviating from the observer's line of vision to the screen.

2. Description of the Prior Art

Generally, the display screen of a display apparatus is covered with a transparent cover plate. When the transparent cover plate is a flat glass plate or a flat transparent synthetic resin plate, external incident light is reflected directly toward the observer along the line of vision of the observer, which dazzles the observer and interferes with the visibility of the display screen.

In order to solve such a problem, glare-proof transparent cover plates have been proposed. Japanese Provisional Patent Publication No. 56-133701 discloses a glare-proof transparent cover plate having a flat back surface and a corrugated front surface provided with parallel sawtooth ridges each having an inclined surface extending at an angle to the back surface and a horizontal surface extending perpendicularly to the back surface. This known transparent cover plate is capable of deflecting the reflection from the front surface thereof from the user's line of vision. However, this transparent cover plate is not provided with any measures to deal with the external light that penetrates the transparent cover plate. External light that penetrates the transparent cover plate is refracted by the transparent cover plate material and is reflected from the flat back surface of the transparent cover plate toward the observer to reduce the visibility of the display screen. Furthermore, in this known transparent cover plate, the light emitted from the spontaneous light emitting screen of a display apparatus or a display apparatus having an internal light source is reflected from the surfaces of the sawtooth ridges in the direction of the user's line of vision to make the surfaces of the sawtooth ridges glitter and/or the light emitted from the display screen of the display apparatus is reflected by the inner surfaces of the sawtooth ridges in the direction of the user's line of vision to duplicate the images displayed on the display screen, which also deteriorates the quality of the images.

SUMMARY OF THE INVENTION

Accordingly, it is a primary object of the present invention to provide a glare-proof transparent cover plate capable of reflecting external light falling on the front surface thereof outside the user's field of vision and suppressing the reflection of any light that penetrates the cover plate and is reflected by the inner surface of the backside of the cover plate inside the user's field of vision, so that the visibility of the display screen is improved.

It is another object of the present invention to provide a glare-proof transparent cover plate capable of suppressing the reflection of light that penetrates the cover plate and is reflected by the inner surfaces of the sawtooth ridges in the direction of the user's line of vision so that the visibility of the display screen is improved.

These and other related objects of the invention are realized in a preferred embodiment by a cover plate in which the back of a transparent cover plate is formed in a flat plane and the front of the same is formed in a parallel arrangement of minute, sawtooth ridges each having an inclined facet inclined at an inclination to the flat plane and a horizontal facet extending substantially perpendicularly to the flat plane, and the inclination of the inclined facet is determined so as to satisfy an inequality:

$$\alpha \geq (\beta + \omega)/2,$$

where $\alpha$ is the inclination of the inclined facet, $\beta$ is the angle of refraction of incident rays of light that penetrate the transparent cover plate and $\omega$ is the critical angle of the material forming the transparent cover plate with respect to air, so that the rays of light reflected by the front of the transparent cover plate are reflected outside the field of vision and the internal reflected rays of light reflected by the inner surface of the flat plane of the transparent cover plate among the rays of light that penetrate the transparent cover plate are reflected totally by the inclined facets for total reflection. Thus, the present invention provides a glare-proof transparent cover plate capable of allowing satisfactory visual recognition of indications on a display apparatus covered herewith.

Furthermore, according to another aspect of the present invention, the back of a transparent cover plate is formed in a flat plane and the front of the same is formed in a parallel arrangement of minute, sawtooth ridges each having an inclined facet inclined at an inclination to the flat plane and a horizontal facet extending substantially perpendicularly to the flat plane, and a shading mask is formed in the inclined facet at least in part of an area in which reflected rays of light reflected by the inner surface of the horizontal facet among the rays of light that penetrate the transparent cover plate fall, so that emission of the internal reflected rays of light through the inclined facet in the direction of the user's line of vision is prevented. Thus, the present invention provides a glare-proof transparent cover plate capable of enhancing the visibility of indications on a display apparatus covered therewith.

Still further, according to yet another aspect of the present invention, minute irregularities are formed in the inclined facets or in the horizontal facets of the sawtooth ridges instead of forming shading masks in the sawtooth ridges, to diffuse rays of light traveling in the direction of the user's line of vision and pigment and/or particles are added to the material in molding the transparent cover plate to produce a colored transparent cover plate so that the rays of light that penetrate the colored transparent cover plate are attenuated within the colored transparent cover plate to reduce the intensity of the rays of light emitted at the edges of the sawtooth ridges. Thus, the colored transparent cover plate enables glare-proof viewing of indications on a display apparatus covered therewith.

BRIEF DESCRIPTION OF THE DRAWINGS

FIG. 3 is a sectional view of a glare-proof transparent cover plate, in a third embodiment, according to the present invention;

FIG. 4 is a perspective view of the third embodiment, showing the general external appearance of the same;

FIG. 5 is a diagrammatic illustration of assistance in explaining the reflection range of the third embodiment when the user's line of vision is perpendicular to the flat surface of the transparent cover plate;

FIG. 6 is a diagrammatic illustration of assistance in explaining the reflection range of the third embodiment when the user's line of vision is not perpendicular to the flat surface of the transparent cover plate;

FIGS. 7 and 8 are fragmentary sectional views of transparent cover plates having printed shading films;

FIGS. 9 and 10 are fragmentary sectional views of a transparent cover plate having shading ink films formed by applying ink to the corrugated front surface of the transparent cover plate;

FIG. 11 is a fragmentary sectional view of a transparent cover plate having shading strips incorporated therein by insert molding;

FIG. 12 is a sectional view of a glare-proof transparent cover plate, in a fourth embodiment, according to the present invention;

FIG. 13 is a perspective view showing the essential portion of the fourth embodiment;

FIG. 14 is a perspective view of a glare-proof transparent cover plate, in a fifth embodiment, according to the present invention;

FIG. 15 is a diagrammatic illustration of assistance in explaining the reflection range of the fifth embodiment when the user's line of vision is not perpendicular to the flat surface of the transparent cover plate; and FIG. 16 is a sectional view of a glare-proof transparent cover plate, in a sixth embodiment, according to the present invention.

DETAILED DESCRIPTION OF THE PREFERRED EMBODIMENTS

Preferred embodiments of the present invention will be described hereinafter with reference to the accompanying drawings.

Figure 1:
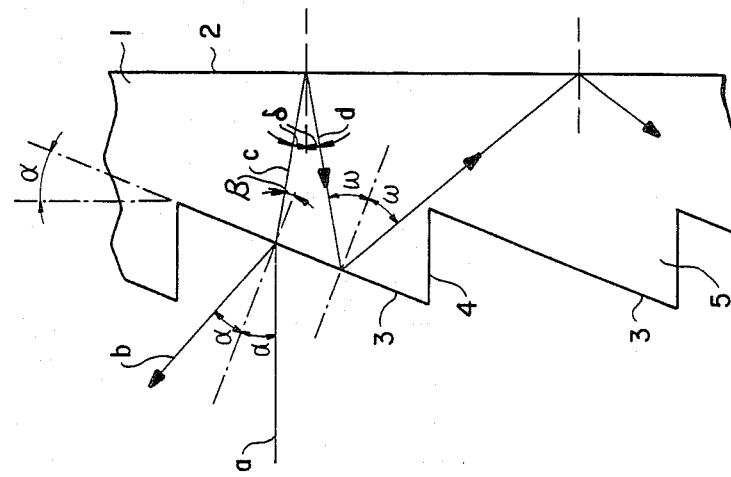
FIG. 1 is a sectional view of a glare-proof transparent cover plate, in a first embodiment, according to the present invention.

FIG. 1 shows a transparent cover plate 1 to be disposed on the front side of a display apparatus such as a CRT, not shown. The back of the transparent cover plate 1, is formed in a flat plane 2 while the front of the same is formed in a parallel arrangement of minute, horizontal, sawtooth ridges 5 each having an inclined facet 3 inclined at an inclination to the flat plane 2 and a horizontal facet 4 extending substantially perpendicularly to the flat plane 2. Most of external incident rays of light a pass through the transparent cover plate 1 while some of the external incident rays of light are reflected by the outer surface of the inclined facets 3 of the ridges 5 formed in the front of the transparent cover plate 1 and the reflected rays of light b reflected by the outer surface of the inclined facets 3 (hereinafter referred to as "external reflected rays of light b") travel outside the user's field of vision, and thereby the formation of an image by the external reflected rays of light b is restricted to the smallest extent.

Suppose that the external incident rays of light a travel along the user's line of vision and fall on the inclined facet 3 inclined at an inclination $\alpha$ and that the user's line of vision is perpendicular to the flat plane 2. Then, both the angle of incidence and the angle of reflection on the inclined facet 3 are $\alpha$. Accordingly, the external reflected rays of light b travel outside the user's field of vision while some of the external incident rays of light penetrate the transparent cover plate 1 and are refracted therein at an angle of refraction $\beta$ that satisfies an equation: $\sin \alpha = n.\sin \beta$. The refracted rays of light c fall on the inner surface of the flat plane 2 at an angle of incidence $\delta$, where $\delta = \alpha - \beta$, and then the refracted rays of light c are reflected by the inner surface of the flat plane 2 at an angle of reflection $\delta$, which is the same as the angle of incidence $\delta$ on the inner surface of the flat plane 2. The rays of light d reflected by the inner surface of the flat plane 2 (hereinafter referred to as "internal reflected rays of light d") fall on the inner surface of the inclined facet 3 of the sawtooth ridge 5 at an angle of incidence $\omega$.

Ordinarily, most rays of light projected on the outer surface of the front of the transparent cover plate 1 penetrate the transparent cover plate 1 and some of the rays of light are reflected by the outer surface of the inclined facet 3. Most rays of light that penetrate the transparent cover plate 1 pass through the transparent cover plate 1 and some of the rays of light that penetrate the transparent cover plate 1 are refracted therein and are reflected by the inner surface of the flat plane 2 within the transparent cover plate 1. In this embodiment, the inclination $\alpha$ of the inclined facet 3 is selected so that the incident angle $\omega$ of the internal reflected rays of light d on the inner surface of the inclined facet 3 is not less than the critical angle of the material of the transparent cover plate 1 in the atmosphere. The inclination is obtained from the following expressions:

$$2\alpha - \beta = \omega \text{ and hence } \alpha = (\beta + \omega)/2,$$

where $\omega$ is the critical angle of the material of the transparent cover plate 1 in the atmosphere. Accordingly, an appropriate inclination $\alpha$ to make the angle of incidence $\omega$ of the internal reflected rays of light d on the inner surface of the inclined facet 3 is determined by an inequality:

$$\alpha \geq (\beta + \omega)/2 \tag{1}$$

Accordingly, when rays of light are projected on the front of the transparent cover plate 1 provided with the ridges 5 having the inclined facets 3 inclined at the angle of inclination $\alpha$ meeting the above-mentioned inequality, the internal reflected rays of light d fall on the inner surface of the inclined facets 3 at an angle of incidence not less than the critical angle $\omega$ of the material of the transparent cover plate 1. Hence the total reflection of the internal reflected rays of light d occurs in the transparent cover plate 1 and the totally reflected internal reflected rays of light d attenuate in the transparent cover plate 1. Consequently, the formation of an image by the internal reflected rays of light d is restricted to the smallest extent. Incidentally, when the inclination $\alpha$ is excessively large, the angle of refraction $\beta$ increase, accordingly increasing the displacement of the image. Therefore, it is preferable that the inclination $\alpha$ of the inclined facet 3 be as large as $(\beta + \omega)/2$.

Figure 2:
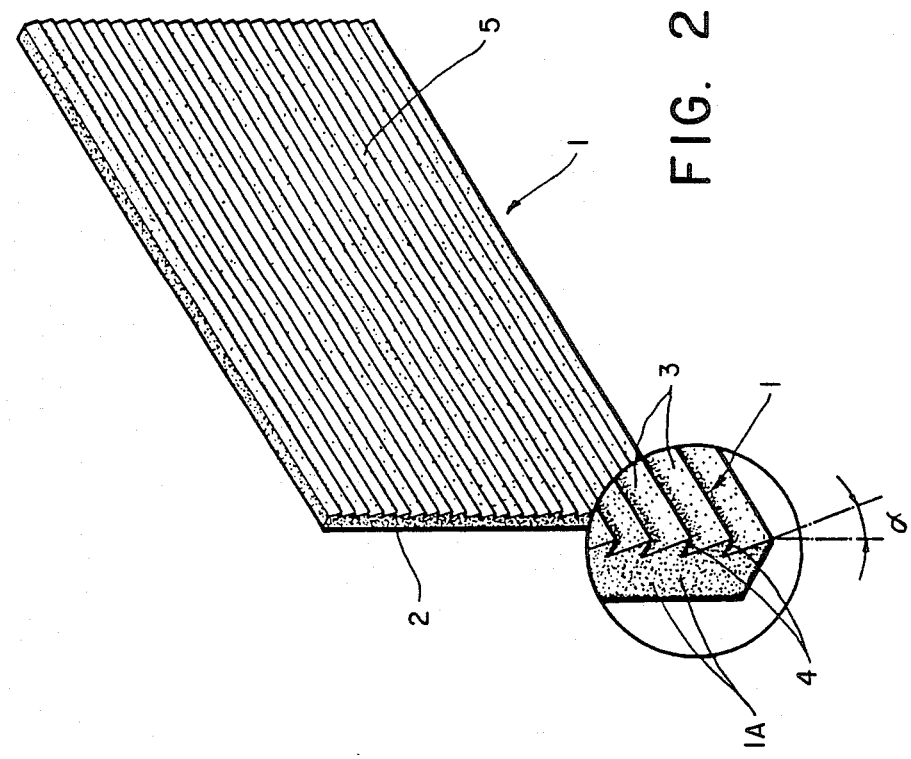
FIG. 2 is a perspective view of a glare-proof transparent cover plate, in a second embodiment, according to the present invention.

FIG. 2 illustrates a second embodiment of the present invention. The second embodiment will be described as applied to a display apparatus such as an instrument of an automobile. A transparent cover plate 1 made of a colored transparent material is placed on the front of a display apparatus, not shown. Continuous and parallel arrangement of minute, horizontal, sawtooth ridges 5 are formed in the front of the transparent cover plate 1. Each sawtooth ridge 5 has a horizontal facet 4 extending substantially along the line of vision of the driver and an inclined facet 3 inclined at an inclination $\alpha$ to the line of vision.

The colored transparent cover plate 1 may be formed of transparent glass containing pigment 1A or a transparent resin containing pigment 1A or particles. The transparent cover plate 1 may be colored to such a degree that indication on the dial of the display apparatus can be clearly recognized through the transparent cover plate 1 when the dial is illuminated by a light source during the night.

External light projected from behind the driver on the transparent cover plate 1 is reflected by the inclined facets 3 outside the field of vision of the driver and, therefore, the indication on the dial of the display apparatus can be recognized clearly. On the other hand, external light falling on the transparent cover plate 1 from other directions passes through the transparent cover plate 1 and illuminates the dial, and the indication on the dial can be recognized satisfactorily. Some of the rays of light that penetrate the transparent cover plate 1 are reflected repeatedly by the inner surfaces of the front and the back of the transparent cover plate 1 as they are absorbed progressively by the pigment 1A. Thus the rays of light that penetrate the transparent cover plate 1 attenuate as they are reflected repeatedly. Accordingly, the annoying glare attributable to the internal reflection is suppressed to enable clear recognition of the indication on the dial of the display apparatus. When the dial of the display apparatus is illuminated by the light source during the night, the rays of light are reflected by the dial in all directions and the reflected rays of light are radiated through the transparent cover plate 1. However, since the reflected rays of light are absorbed by the pigment 1A or the particles contained in the colored transparent cover plate 1 and attenuate within the colored transparent cover plate 1, only the attenuated rays of light are condensed at the edges of the sawtooth ridges 5, so that the indication on the dial can be recognized clearly. In the second embodiment, the transparent cover plate is colored with pigment or particles to regulate the transmissivity thereof. However, the transmissivity of the transparent cover plate 1 can be regulated also by darkening the transparent cover plate 1 in a smoky tone with untransmissive particles. The application of the second embodiment is not limited to automotive instruments but is applicable also to other instruments and display apparatus such as CRTs.

FIGS. 3 to 6 illustrate a third embodiment of the present invention. The third embodiment is intended particularly to reduce the reflection of the internal reflected rays of light by the inner surface of the horizontal facets in the direction of the user's line of vision.

Referring to FIGS. 3 to 6, the back of a transparent cover plate 1 to be disposed on the front side of a display apparatus such as a CRT, not shown, is formed in a flat plane 2 while the front of the same is formed in a parallel arrangement of minute, horizontal, sawtooth ridges 5 each having an inclined facet 3 inclined at an inclination to the flat plate 2 and a horizontal facet 4 extending substantially perpendicularly to the flat plane 2. A shading mask 8 is formed so as to cover at least part of an area A in the inclined facet 3 through which pass the reflected rays of light 7 reflected by the inner surface of the horizontal facet 4 among the rays of light that penetrate the transparent cover plate 1 from behind the back. Suppose that the user's line of vision is perpendicular to the flat plane 2 of the transparent cover plate 1. Then, the area A in which the reflected rays of light 7 fall is determined from the following analytical procedure.

Referring to FIG. 5, when the inclination of the inclined facet 3 is $\alpha$, external rays of light 6 that penetrate the transparent cover plate 1 from behind the back or the internal reflected rays of light reflected by the inner surface of the flat plane 2 are refracted at an angle of refraction $\alpha$, and the refracted rays of light 6A travel in a direction perpendicular to the flat plane 2 in the field of vision. A range between the intersection of the external rays of light 6 passing the bottom 9 of a furrow between the adjacent sawtooth ridges 5 and the inclined facet 3, and the edge 11 of the sawtooth ridge 5 corresponds to the area A. In this case, the angle of inclination $\theta$ of the external rays of light 6 to a perpendicular to the flat plane 2 is expressed by $$\theta = \alpha - \beta$$

where $\beta$ is the angle of incidence of the external rays of light 6 on the inclined facet 3. Since $$n.\sin\beta = \sin\alpha, \text{ hence, } \beta = \sin^{-1}(\sin\alpha/n)$$

$$\theta = \alpha - \sin^{-1}(\sin\alpha/n) \qquad (2)$$

where n is the refractive index of the material of the transparent cover plate 1.

When the line of vision is oblique with respect to a perpendicular to the flat plane 2, the area A is determined by the following procedure.

Suppose that the angle of inclination of the inclined facet 3 is $\alpha$ and the user's line of vision is inclined to a perpendicular to the flat plane 2 at an inclination $\gamma$ as illustrated in FIG. 6. Then, the external rays of light 6 penetrated the transparent cover plate 1 through the back or the external rays of light penetrated the transparent cover plate 1 through the front and reflected by the inner surface of the flat plane 2 are refracted at an angle of refraction $\alpha - \gamma$, and then the refracted rays of light 6A are emitted into the field of vision. A range between the intersection 10 of the external rays of light 6 or the internal reflected rays of light passing the bottom 9 of the furrow between the adjacent sawtooth ridges 5 and the inclined facet 3, and the edge 11 of the sawtooth ridge 5 corresponds to the area A. In this case, the angle of inclination $\theta$ of the external rays of light 6 or the internal reflected rays of light to a perpendicular to the flat plane 2 is obtained from;

$$\sin(\alpha - \gamma)/\sin(\alpha - \beta) = n, \text{ therefore,} \qquad (3)$$
$$\sin(\alpha - \theta) = \sin(\alpha - \gamma)/n$$
$$\alpha - \theta = \sin^{-1}\{\sin(\alpha - \gamma)/n\}$$
$$\theta = \alpha - \sin^{-1}\{\sin(\alpha - \gamma)/n\}$$

When $\gamma = 0$ in Expression (3), Expression (3) is equivalent to Expression (2).

When the shading mask 8 is formed over the entire range of the area A or over a range including the area A, a portion of the inclined facet 3 outside the area A and a portion of the horizontal facet 4, the emission of the reflected rays of light 7 reflected by the horizontal facet 4 into the field of vision is prevented. When the shading mask 8 is formed partially over the area A, the emission of the reflected rays of light 7 into the field of vision is reduced.

FIGS. 7 to 11 illustrate exemplary methods of forming the shading mask 8.

FIGS. 7 and 8 illustrate a method in which the shading masks 8 of a light-absorptive color, such as black, are formed by printing. The shading masks 8 may be formed over the sharp edges of the sawtooth ridges 5 shown in FIGS. 3 to 6. However, it is also possible to form a flat surface 12 at the top of the sawtooth ridge 5 as shown in FIG. 7 and to form the shading mask 8 over the flat surface 12 by printing, or to form a flat protrusion 13 at the top of the sawtooth ridge 5 as shown in FIG. 8 and to form the shading mask 8 over the flat front surface 12 of the flat protrusion 13 by printing.

FIGS. 9 and 10 illustrate a method in which the shading mask 8 is formed by applying ink to the edge of the sawtooth ridge 5 of the transparent cover plate 1. In this method, a layer of ink 14 is pressed against the edge of the sawtooth ridge 5 to form the shading mask 8 over a portion of the inclined facet 3 as well as a portion of the horizontal facet 4 near the edge of the sawtooth ridge 5.

FIG. 11 illustrates another method in which the shading mask 8 if formed by insert molding. A shading member 15 having a triangular cross section is buried in the edge of the sawtooth ridge 5 by insert molding.

Preferably, the transparent cover plate is formed of a colorless, transparent synthetic resin sheet, a colored transparent synthetic resin sheet or a transparent glass plate. When such a transparent sheet is employed for forming the transparent cover plate, the transparent sheet may be applied to a transparent substrate.

The edges of the sawtooth ridges 5 may be rounded.

The shading mask 8 may be formed by stamping a hot stamping foil on the edges of the sawtooth ridges 5.

FIGS. 12 and 13 illustrate a fourth embodiment of the present invention. The fourth embodiment will be described as applied to a display apparatus of the spontaneous light emission type, such as a CRT.

Referring to FIGS. 12 and 13, a colorless, transparent cover plate 1 is disposed in front of the screen of a CRT, not shown. The back of the transparent cover plate 1 is formed in a flat plane 2 while the front of the same is formed in a parrallel arrangement of minute, horizontal, sawtooth ridges 5 each having an inolined facet 3 inclined at an inclination to the flat plane 2 and a horizontal facet 4 extending perpendicularly to the flat plane 2. Minute irregularities 16 are formed in the horizontal facet 4 by, for example, satin-finishing process. Accordingly, external rays of light projected on the front surface of the transparent cover plate 1 are reflected by the inclined facets 3 of the sawtooth ridges 5 outside the field of vision in directions other than that of the line of vision, so that the screen is clearly visible.

When external rays of light penetrate the transparent cover plate 1 through the front and reflected by the inner surface of the flat plane 2, or rays of light 6 emitted from the internal light source of the CRT and penetrate the transparent cover plate 1 through the back fall on the horizontal facets 4 of the sawtooth ridges 5, the external rays of light or the rays of light 6 are diffused by the minute irregularities 16 formed in the horizontal facets 4. Accordingly, local glare of the horizontal facets 4 is prevented.

FIGS. 14 and 15 illustrate a fifth embodiment of the present invention. A transparent cover plate 1 is made of a colored, transparent plate. The back of the transparent cover plate 1 is formed in a flat plane 2 while the front of the same is formed in a parallel arrangement of minute, horizontal, sawtooth ridges 5 each having an inclined facet 3 inclined at an inclination to the flat plane 2 and a horizontal facet 4 extending substantially perpendicularly to the flat plane 2. Minute irregularities 17 are formed at least in a portion of an area A in the inclined facet 3 through which reflected rays of light 7 among external rays of light 6 penetrated the transparent cover plate 1 and reflected by the inner surface of the horizontal facet 4 are emitted into the field of vision.

When the user's line of vision is oblique to the perpendicular to the flat plane 2 of the transparent cover plate 1, the area A is determined from the following conditions. Suppose that the inclination of the inclined facet 3 is $\alpha$ and the angle of inclination of the line of vision to the perpendicular to the flat plane 2 is $\gamma$ as illustrated in FIG. 13. External rays of light 6 penetrated the transparent cover plate 1 through the back or external rays of light penetrated the transparent cover plate 1 through the front and reflected by the inner surface of the flat plane 2 is refracted at an angle of refraction $\alpha - \gamma$, and the refracted rays of light 6A are emitted into the field of vision. A range between the intersection 10 of the rays of light 6 passing the bottom of the furrow 9 between the adjacent sawtooth ridges 5 and the inclined facet 3, and the edge 11 of the sawtooth ridge 5 corresponds to the area A. In this case, the angle $\theta$ of the direction of travel of the external rays of light 6 within the transparent cover plate 1 or the rays of light reflected by the inner surface of the flat plane 2 to the perpendicular to the flat plane 2 is determined by the following conditions. Since $$n = \sin(\alpha - \gamma)/\sin(\alpha - \theta) \text{ and, hence, } \sin(\alpha - \theta) = \sin(\alpha - \gamma)/n, \text{ and } \alpha - \theta = \sin^{-1}\{\sin(\alpha - \gamma)/n\}$$

where n is the refractive index of the material of the transparent cover plate 1, $$\theta = \alpha - \sin^{-1}\{\sin(\alpha - \gamma)/n\} \quad (4)$$

When $\gamma = 0$, $$\theta = \alpha - \sin^{-1}\{(\sin \alpha)/n\} \quad (5)$$

Expression (5) provides $\theta$ for the area A when the user's line of the vision is perpendicular to the flat plane 2 of the transparent cover plate 1.

The minute irregularities 17 formed over the entire range of the area A or over a range including the area A and a portion of the inclined facet 3 outside the area A diffuse the reflected rays of light 7 reflected by the horizontal facet 4 toward the inclined facet 3, so that the emission of the reflected rays of light 7 into the field of vision is prevented.

FIG. 16 illustrates a sixth embodiment of the present invention. The sixth embodiment will be described as applied to an automotive instrument or the like.

The front of a colored transparent cover plate 1 is formed in a parallel arrangement of minute, horizontal, sawtooth ridges 5 each having an inclined facet 3 inclined at an inclination $\alpha$ to a perpendicular to the line of vision of the driver and a horizontal facet 4 extending substantially parallel to the line of vision of the driver. Minute irregularities 18 are formed in a narrow area in the inclined facet 3 along the edge of the sawtooth ridge 5 and in the entire area of the horizontal facet 4.

The colored transparent cover plate 1 is formed of transparent glass containing pigment 1A or a transparent resin containing pigment 1A or particles. The transparent cover plate 1 may be colored to such a degree that any indication on the dial of the instrument can be recognized clearly through the colored transparent cover plate 1 when the dial is illuminated by a light source during the night.

Most external rays of light projected on the front of the transparent cover plate 1 from behind the driver penetrate through the transparent cover plate 1 and fall on the dial of the instrument to illuminate the dial, while some of the external rays of light are reflected outside the field of vision by the inclined facets 3, so that the indication on the dial of the instrument can be clearly recognized. On the other hand, some of the external rays of light that penetrate the transparent cover plate 1 are reflected repeatedly by the inner surfaces of the front and the back of the transparent cover plate 1. However, the reflected rays of light are diffused by the minute irregularities 18 formed in the inclined facets 3 and the horizontal facets 4, and hence the reflected rays of light will not be emitted into the field of vision.

The irregularities 16, 17 and 18 may be formed by molding the transparent cover plate 1 by means of molds having irregularities corresponding to the irregularities 16, 17 and 18, respectively, or may be formed by suitable means after molding the transparent cover plate 1.

Although the invention has been described hereinabove in its preferred forms with a certain degree of particularity, it is to be understood that many variations and changes are possible in the invention without departing from the scope and spirit thereof.

I claim:

1. A glare-proof transparent cover plate comprising: a back formed in a flat plane; and a front formed in a parallel arrangement of minute, sawtooth ridges each having a horizontal facet extending substantially perpendicularly to the flat plane and an inclined facet inclined to the flat plane at an inclination satisfying an inequality $\alpha \geq (\beta + \omega)/2$, where $\alpha$ is the inclination of the inclined facet to the flat plane, $\beta$ is the angle of refraction of the incident rays of light within the transparent cover plate, and $\omega$ is the critical angle of the material forming the transparent cover plate.

2. A glare-proof transparent cover plate as recited in claim 1, wherein minute irregularities are formed in the horizontal facets of the sawtooth ridges formed in the front of the transparent cover plate.

3. A glare-proof transparent cover plate as recited in claim 1, wherein minute irregularities are formed in the inclined facets in a narrow area along the edges of the sawtooth ridges.

4. A glare-proof transparent cover plate as recited in claim 1, wherein the transparent cover plate is formed of a colored transparent material.

5. A glare-proof transparent cover plate as recited in claim 4, wherein pigment and/or particles are added to the material in molding the transparent cover plate to color the same.

6. A glare-proof transparent cover plate as recited in claim 1, wherein said shading masks are formed by insert-molding an opaque shading member in respective edges of the sawtooth ridges.

7. A glare-proof transparent cover plate comprising: a back formed in a flat plane; a front formed in a parallel arrangement of minute, sawtooth ridges each having a horizontal facet extending substantially perpendicularly to the flat plane, and an inclined facet inclined to the flat plane at an inclination satisfying an inequality $\alpha \geq (\beta + \omega)/2$, where $\alpha$ is the inclination of the inclined facet to the flat plane, $\beta$ is the angle of refraction of the incident rays of light within the transparent cover plate, and $\omega$ is the critical angle of the material forming the transparent cover plate; and shading masks each formed in a respective inclined facet at least in part of an area through which reflected rays of light reflected by an inner surface of the horizontal facet among the rays of light that penetrate the transparent cover plate are emitted into the field of vision.

8. A glare-proof transparent cover plate as recited in claim 7, wherein said shading masks are formed on respective edges of the sawtooth ridges by printing.

9. A glare-proof transparent cover plate as recited in claim 7, wherein said shading masks are formed by insert-molding an opaque shading member in respective edges of the sawtooth ridges.

10. A glare-proof transparent cover plate as recited in claim 7, wherein the transparent cover plate is formed of a colored transparent material.

11. A glare-proof transparent cover plate comprising: a back formed in a flat plane; a front arranged to face an observer's eye and formed in a parallel arrangement of minute, sawtooth ridges each having a horizontal facet extending substantially perpendicularly to the flat plane and provided with irregularities capable of diffusing rays of light reflected within the transparent cover plate, and an inclined facet inclined to the flat plane at an inclination.

12. A glare-proof transparent cover plate as recited in claim 11, wherein the transparent cover plate is formed of a colored transparent material.

13. A glare-proof transparent cover plate comprising: a back formed in a flat plane; a front formed in a parallel arrangement of minute, sawtooth ridges each having a horizontal facet extending substantially perpendicularly to the flat plane and an inclined facet inclined to the flat plane at an inclination satisfying an inequality $\alpha \geq (\beta + \omega)/2$, where $\alpha$ is the inclination of the inclined facet to the flat plane, $\beta$ is the angle of refraction of the incident rays of light within the transparent cover plate, and $\omega$ is the critical angle of the material forming the transparent cover plate and provided with minute irregularities formed at least in part of an area through which reflected rays of light reflected by an inner surface of the horizontal facet are emitted into the field of vision.

14. A glare-proof transparent cover plate as recited in claim 13, wherein the transparent cover plate is formed of a colored transparent material.

* * * * *